United States Patent
Soubjaki

(10) Patent No.: US 11,821,528 B2
(45) Date of Patent: Nov. 21, 2023

(54) PLANETARY FLUID CONTROL VALVE

(71) Applicant: Hanon Systems, Daejeon (KR)

(72) Inventor: Houssam Soubjaki, Detroit, MI (US)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 17/818,100

(22) Filed: Aug. 8, 2022

(65) Prior Publication Data
US 2023/0220919 A1     Jul. 13, 2023

Related U.S. Application Data

(60) Provisional application No. 63/298,862, filed on Jan. 12, 2022.

(51) Int. Cl.
| | |
|---|---|
| *F16K 11/16* | (2006.01) |
| *F16K 27/04* | (2006.01) |
| *F16K 31/53* | (2006.01) |

(52) U.S. Cl.
CPC .......... *F16K 11/165* (2013.01); *F16K 27/045* (2013.01); *F16K 31/535* (2013.01)

(58) Field of Classification Search
CPC ................................. F16K 11/165; F16K 3/08
See application file for complete search history.

(56) References Cited

U.S. PATENT DOCUMENTS

| | | | |
|---|---|---|---|
| 6,076,365 A | 6/2000 | Benatav | |
| 2004/0026647 A1* | 2/2004 | Hashimoto | ......... F16K 11/0746 251/248 |
| 2008/0105842 A1 | 5/2008 | Webster et al. | |

FOREIGN PATENT DOCUMENTS

| | | | | |
|---|---|---|---|---|
| CN | 205350394 U | | 6/2016 | |
| GB | 2463653 A | * | 3/2010 | ............. F16K 3/085 |
| JP | 2017172668 A | | 9/2017 | |
| KR | 20190130033 A | | 11/2019 | |
| WO | WO-2023025688 A1 | * | 3/2023 | |

\* cited by examiner

*Primary Examiner* — Reinaldo Sanchez-Medina
*Assistant Examiner* — Nicole Gardner
(74) *Attorney, Agent, or Firm* — Shumaker, Loop & Kendrick, LLP; James D. Miller

(57) ABSTRACT

A fluid control valve includes a valve assembly having a ring gear, an array of first rotary valve bodies, an array of second rotary valve bodies, and a sealing plate. Each of the first rotary valve bodies includes at least one first flow path formed therethrough and each of the second rotary valve bodies includes at least one second flow path formed therethrough. The sealing plate includes a plurality of flow openings formed axially therethrough with each of the flow openings configured to provide fluid communication between one of the first flow paths of the array of first rotary valve bodies and one of the second flow paths of the array of second rotary valve bodies. Rotation of the ring gear causes selective rotation of the first and second rotary valve bodies to alter the flow configuration present between the arrays of the first and second rotary valve bodies.

20 Claims, 8 Drawing Sheets

PLANETARY FLUID CONTROL VALVE

CROSS-REFERENCE TO RELATED APPLICATION

This patent application claims priority to U.S. Provisional Patent Application Ser. No. 63/298,862, filed on Jan. 12, 2022, the entire disclosure of which is hereby incorporated herein by reference.

FIELD OF THE INVENTION

The invention relates to a fluid control valve, and more particularly, a multi-port planetary fluid control valve configured for adjustment to a plurality of different configurations for prescribing a plurality of different flow arrangements through the fluid control valve.

BACKGROUND

It has become increasingly common for various fluid systems to incorporate multi-port fluid valves in order to prescribe a desired flow configuration with respect to multiple different flow paths of the associated fluid, as opposed to merely allowing or preventing a flow of a single flow of fluid therethrough. Such multi-port valves may be utilized to combine, divide, switch, or redirect one or more fluid flow paths associated with the corresponding fluid system. Such multi-port valves may be utilized with respect to a fluid system having multiple different modes of operation requiring multiple different flow configurations through the corresponding multi-port valve in order to communicate the corresponding fluid to the desired components of the associated fluid system, including reversing flow such that ports previously acting as inlets are switched to acting as outlets, and vice versa. For example, such multi-port valves may be utilized within a thermal management system configured to heat or cool various components of a vehicle, or to heat or cool the air to be delivered to a passenger cabin of such a vehicle, depending on a selected mode of operation of the vehicle. Such multi-port valves can be utilized to increase an efficiency of such systems by allowing for complex flow configurations that avoid the unnecessary loss of energy from certain processes associated with operation of the fluid system.

However, such multi-port valves are also typically associated with increased complexity, such as requiring additional fluid connections in need of sealing or additional moving components in order to achieve a desired flow configuration. Such added complexity tends to increase the cost of the corresponding system while frustrating the ability to package the multi-port valve relative to adjacent components, and further requires the creation of a control scheme to ensure proper operation of the system when switching between the different positions of the multi-port valve, which may be associated with switching the system between different operating modes requiring dramatic changes in the flow configuration through the multi-port valve.

Accordingly, there exists a need in the art to produce an improved multi-port fluid control valve that can efficiently and effectively provide fluid communication between multiple different inlets and outlets depending on a selected configuration of the multi-port fluid control valve.

SUMMARY OF THE INVENTION

According to an embodiment of the present invention, an improved multi-port fluid control valve having expanded flow variability is disclosed. The fluid control valve includes a first valve assembly comprising a cylindrical first ring gear configured to selectively rotate about an axis of rotation thereof. An array of first rotary valve bodies, each of which is cylindrical in shape, is configured to selectively rotate about a respective axis of rotation in reaction to rotation of the first ring gear. Each of the first rotary valve bodies includes at least one first flow path formed therethrough. An array of second rotary valve bodies is offset from the array of the first rotary valve bodies with respect to an axial direction of the first ring gear. Each of the second rotary valve bodies is cylindrical in shape and is configured to selectively rotate about a respective axis of rotation in reaction to rotation of the first ring gear, and each of the second rotary valve bodies includes at least one second flow path formed therethrough. A first sealing plate is disposed between the array of the first rotary valve bodies and the array of the second rotary valve bodies with respect to the axial direction of the first ring gear. The first sealing plate includes a plurality of first flow openings formed axially therethrough with each of the first flow openings configured to provide fluid communication between one of the first flow paths of the array of first rotary valve bodies and one of the second flow paths of the array of second rotary valve bodies.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

FIGS. 1-8 illustrate a multi-port planetary fluid control valve 10 according to an embodiment of the present invention, referred to hereinafter as the control valve 10 for brevity. The presently disclosed control valve 10 may be utilized in automotive applications, for example, including the control of various fluids associated with operation of a hydraulic system, a pneumatic system, a fuel system, a cooling system, or a heating, ventilating, and air conditioning (HVAC) system of the associated vehicle. The fluids suitable for use with the control valve 10 may be air, any hydraulic fluids, any types of fuel, any refrigerants, or any coolants typically utilized with respect to such vehicular systems, as desired. However, it should also be apparent that the present control valve 10 may be adapted for use with any fluid associated with any fluid conveying system without necessarily departing from the scope of the present invention.

Figure 1:
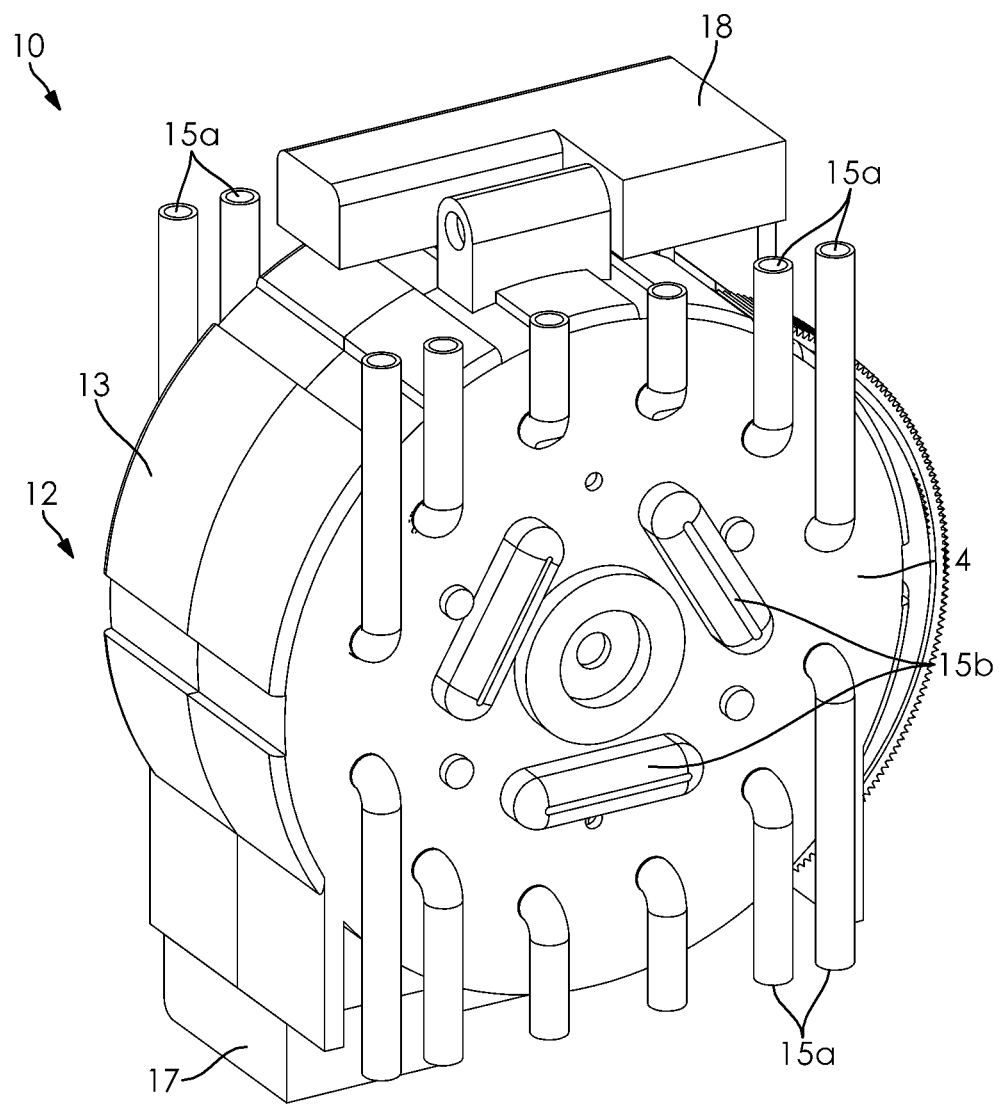
FIG. 1 is a perspective view of a planetary multi-port fluid control valve according to an embodiment of the present invention.
Figure 2:
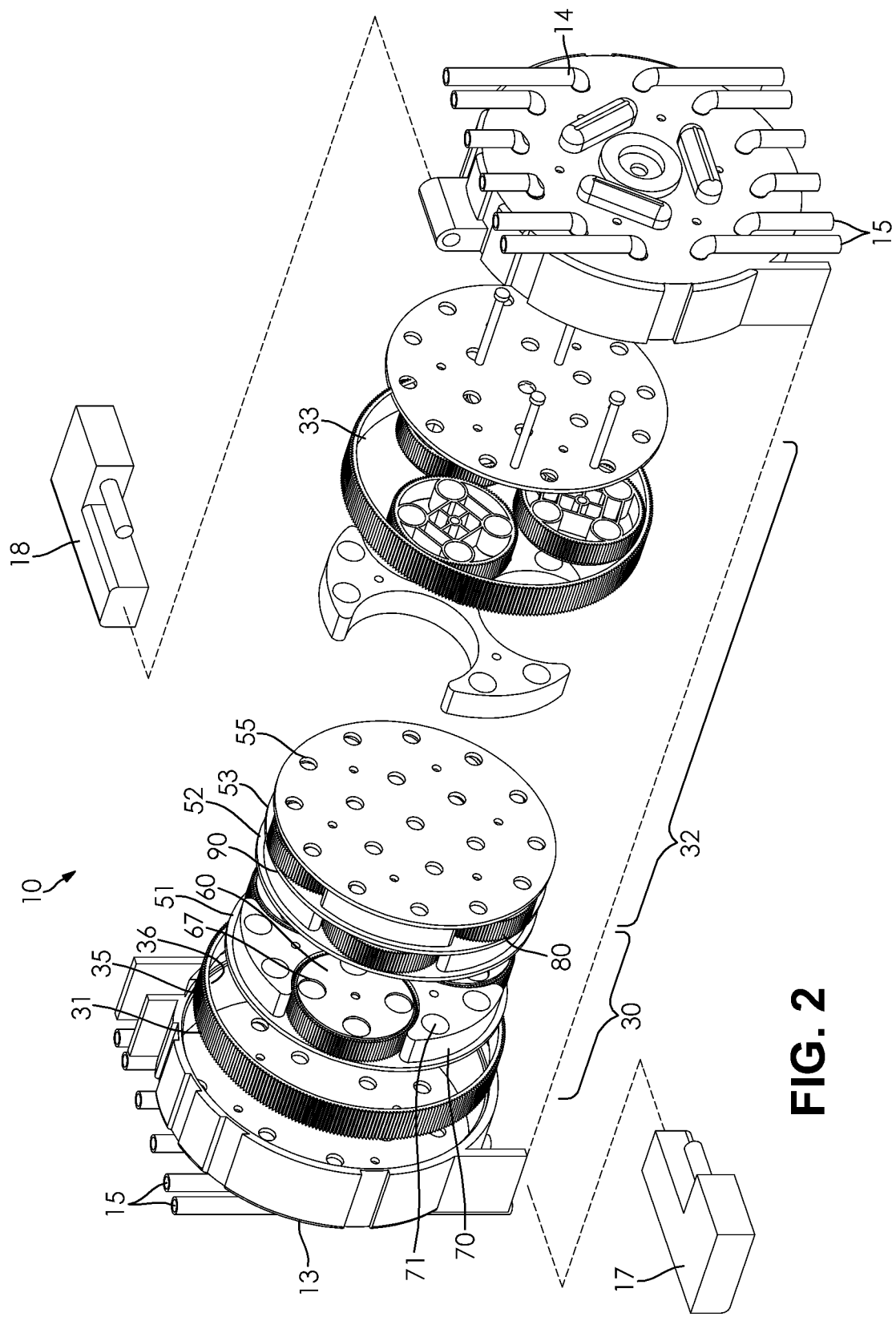
FIG. 2 is an exploded perspective view of the control valve of FIG. 1 showing the arrangement of two axially adjacent valve assemblies of the control valve.

The control valve 10 includes a casing 12 formed from a first shell 13 and a cooperating second shell 14 that may meet along a seam, which may be substantially planar in configuration. The first shell 13 and the second shell 14 each include a plurality of fluid ports 15 extending therefrom. The fluid ports 15 may include external fluid ports 15a and turnaround fluid ports 15b. The external fluid ports 15a are configured to operate as inlets or outlets of the control valve 10 for receiving or delivering an associated fluid to or from external components and/or fluid lines of the associated fluid system. Each of the external fluid ports 15a may accordingly be coupled to a corresponding fluid line or adjacent components at a distal end of each of the external fluid ports 15a. The turnaround fluid ports 15b are provided as turn-around conduits extending through 180 degrees of curvature for changing the direction of flow of the fluid passing therethrough at the position of the corresponding shell 13, 14. As best shown in FIG. 2, each of the fluid ports 15 is in fluid communication with a hollow space defined within the corresponding one of the shells 13, 14 via an opening formed through an axial end wall of the corresponding one of the shells 13, 14.

The control valve 10 further includes a first actuator 17 and a second actuator 18. Each of the actuators 17, 18 may be a rotary actuator, as desired. However, alternative actuators may be utilized without departing from the scope of the present invention. The first actuator 17 includes an axially extending rotor that is received within an opening formed through the first shell 13 for operative engagement with a first ring gear 31 of a first gear assembly 30, which is disposed within the hollow space defined by the first shell 13. The second actuator 18 similarly includes an axially extending rotor that is received within an opening formed through the second shell 14 for operative engagement with a second ring gear 33 of a second gear assembly 32, which is disposed within the hollow space defined by the second shell 14.

The first ring gear 31 of the first valve assembly 30 is substantially cylindrical in shape and substantially corresponds to the shape of the hollow space of the first shell 13. The first ring gear 31 is rotatably mounted to the casing 12 to rotate about a central rotational axis thereof, which corresponds to the axial direction of the control valve 10 as described hereinafter. An outer surface of the first ring gear 31 includes outer teeth 35 that are configured to engage corresponding teeth of the first actuator 17 to cause the selective rotation of the first ring gear 31 relative to the casing 12. The first actuator 17 may be any type of actuator suitable for causing selective rotation of the first ring gear 31 in either of two opposing rotational directions, and is therefore not limited to the use of an axially extending rotor. For example, a linear actuator having teeth configured to engage the outer teeth 35 of the first ring gear 31 may be utilized, wherein such a linear actuator reciprocates while engaging the outer teeth 35 to prescribe the desired rotation of the first ring gear 31. The second actuator 18 is also not limited to an axially extending rotor, and may be any actuator capable of causing selective rotation of the second ring gear 33 in either of two opposing rotational directions. The invention is also not limited to the use of a geared transfer of rotational motion, as various other rotational drive systems may be utilized to prescribe the rotation of each of the described and illustrated components. Drive mechanisms may include a worm drive, a belt, or a spur, as non-limiting examples.

The first valve assembly 30 further includes a first sealing plate 51, an array of first rotary valve bodies 60, a first fixed valve body 70, a second sealing plate 52, an array of second rotary valve bodies 80, a second fixed valve body 90, and a third sealing plate 53. Each of the sealing plates 51, 52, 53 is substantially planar and arranged perpendicular to the axial direction of the control valve 10, wherein the respective sealing plates 51, 52, 53 are further spaced from one another with respect to the axial direction of the control valve 10. The first array of rotary valve bodies 60 and the first fixed valve body 70 are each disposed between the first sealing plate 51 and the second sealing plate 52 while the second array of rotary valve bodies 80 and the second fixed valve body 90 are each disposed between the second sealing plate 52 and the third sealing plate 53. The rotary valve bodies 60 and the first fixed valve body 70 each extend axially such that each of the opposing axial end surfaces thereof is arranged co-planar to and in contact with a facing one of the sealing plates 51, 52 to ensure that a suitable seal is formed at each position of engagement. Similarly, the rotary valve bodies 80 and the second fixed valve body 90 each extend axially such that each of the opposing axial end surfaces thereof is arranged co-planar to and in contact with a facing one of the sealing plates 52, 53.

The first valve assembly 30 may accordingly be said to have a layered or stacked configuration including a first layer and a second layer, each of which is separated from one another by one of the sealing plates 51, 52, 53 with respect to an axial direction of the first valve assembly 30. The stacked configuration may include the layers and sealing plates 51, 52, 53 compressed to one another in the axial direction to ensure that a suitable sealing force is present at the axial end surface of each described component. This force may be selected to still allow for relative movement between the components forming each of the valve assemblies 30, 32 while maintaining the desired sealing effect. As described in greater detail hereinafter, this force may be variable to facilitate such relative motion between the components forming the valve assemblies 30, 32.

The first sealing plate 51 includes a plurality of flow openings 55 formed axially therethrough. Each of the flow openings 55 may be axially aligned with one of the fluid ports 15 at the axial end wall of the first shell 13 and is configured to allow a corresponding fluid to pass through the first sealing plate 51 with respect to the axial direction for entering or exiting the remainder of the first valve assembly 30. In some embodiments, as explained hereinafter, some of the positions of the fluid ports 15 may not include one of the axially aligned flow openings 55 formed within the first sealing plate 51, thereby forming a delimiting wall segment where the fluid cannot pass axially through the first sealing plate 51. This may occur when a flow configuration at the position devoid of one of the flow openings 55 includes the corresponding fluid being redirected laterally or caused to turn around for flowing in an opposing axial direction.

Figure 5:
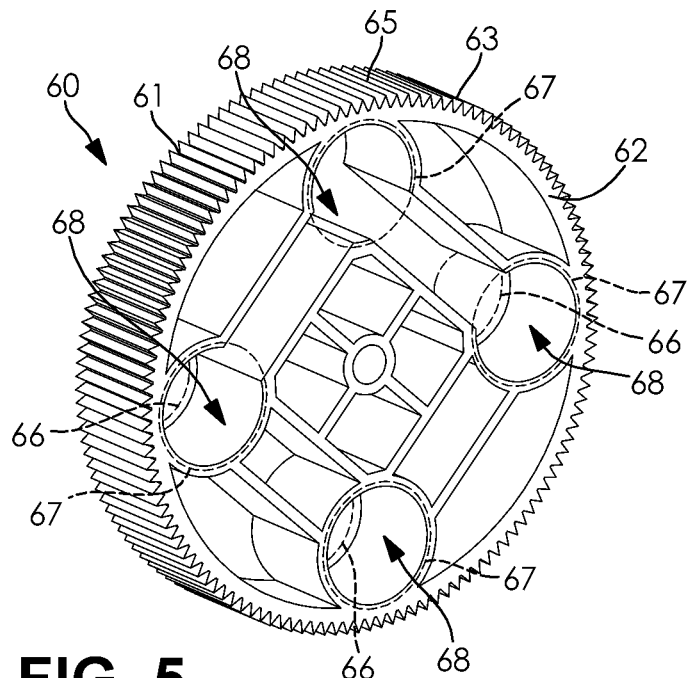
FIG. 5 is a perspective view of a rotary valve body of the control valve, wherein the end faces of the rotary valve body are shown as transparent to illustrate the interior flow paths formed within the rotary valve body, and wherein a perimeter of each port opening formed through each of the transparent end faces is shown in dashed line form.

As best shown in FIG. 5, each of the valve bodies 60 forming the first array is substantially cylindrical in shape and includes a first axial end surface 61, an opposing second axial end surface 62, and a circumferential surface 63 axially connecting the end surfaces 61, 62. The circumferential surface 63 includes outer teeth 65 configured to engage inner teeth 36 arranged along an inner surface of the first ring gear 31. Each of the valve bodies 60 is rotatably mounted to the casing 12 to allow for rotation of each of the valve bodies 60 about a respective central rotational axis thereof relative to the stationary casing 12. The axis of rotation of each of the valve bodies 60 may be formed by a rod or shaft extending axially through the control valve 10, as shown in FIG. 2. Components including each of the sealing plates 51, 52, 53, each of the rotary valve bodies 60, 80, and each of the fixed valve bodies 70, 90 may include axially extending openings or holes configured to receive such rods or shafts. Such rods or shafts may also extend through the control valve 10 for assembling the axially stacked components in the desired configuration.

Each of the valve bodies 60 is positioned within the first ring gear 31 such that the circumferential surface 63 of each respective valve body 60 contacts the inner surface of the first ring gear 31 at one tangential position to allow for engagement between the inner teeth 36 of the ring gear 31 and the outer teeth 65 of the respective valve body 60. Rotation of the first ring gear 31, as caused by actuation of the first actuator 17, is thus able to cause a corresponding rotation of each of the corresponding valve bodies 60 where engagement is instantaneously present between the inner teeth 36 of the first ring gear 31 and the outer teeth 65 of each respective valve body 60.

Figure 6:
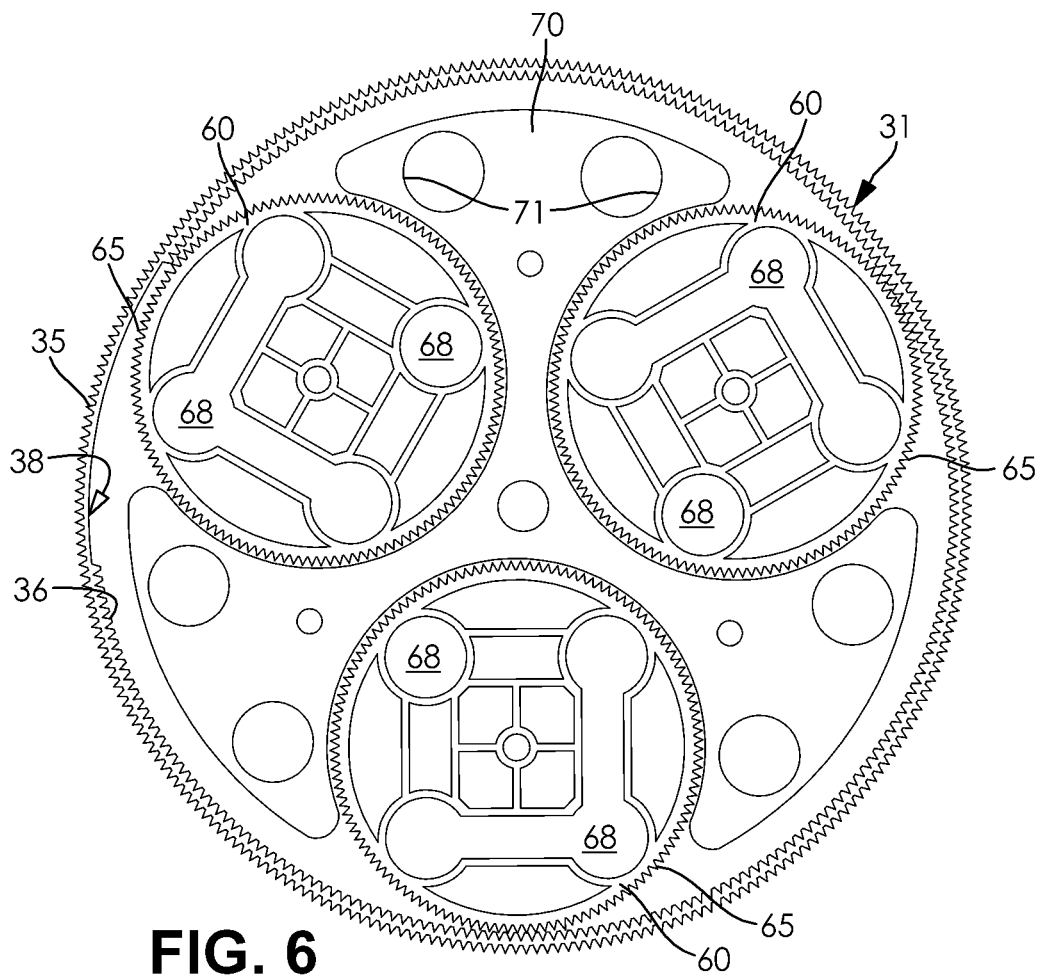
FIG. 6 illustrates an interaction between a plurality of rotary valve bodies and the surrounding ring gear, and wherein the end face of each of the rotary valve bodies is shown as transparent to illustrate the interior flow paths formed therein.

The inner surface of the first ring gear 31 may include segments devoid of the inner teeth 36 to cause each of the valve bodies 60 instantaneously facing towards such segments at the described tangential position to remain stationary and devoid of relative rotation when the first ring gear 31 passes thereover in the absence of contact between the facing teeth 36, 65. Such discontinuous segments may be utilized to introduce variability to the configurations possible via the control valve 10 by allowing certain valve bodies 60 to rotate and assume new operational positions while other valve bodies 60 remain stationary at a previous operational position. For example, the first ring gear 31 is illustrated in FIG. 6 as including a segment 38 of the inner surface thereof that is devoid of the inner teeth 36 at a position immediately adjacent the tangential point of engagement with one of the valve bodies 60 such that clockwise rotation of the first ring gear 31 from the illustrated view will result in the one of the valve bodies 60 not undergoing a further rotation about the respective axis of rotation. In contrast, the remaining two valve bodies 60 illustrated in FIG. 6 are configured to undergo rotation in the clockwise direction in reaction to the clockwise rotation of the first ring gear 31, thereby causing these valve bodies 60 to assume new operational positions following such rotation.

The first axial end surface 61 of each of the valve bodies 60 includes an array of first fluid ports 66 while the second axial end surface 62 of each of the valve bodies 60 includes an array of second fluid ports 67. Each of the fluid ports 66, 67 refers to an axially extending opening formed through the corresponding one of the axial end surfaces 61, 62 with each of the fluid ports 66, 67 in fluid communication with at least one flow path 68 formed through the respective valve body 60. Each of the flow paths 68 is provided as a hollow space within the respective valve body 60 that connects at least two of the fluid ports 66, 67 to one another, with each of the fluid ports 66, 67 acting as an inlet or an outlet into the corresponding flow path 68.

One or more of the flow paths 68 may extend axially for communicating fluid between one or more of the first fluid ports 66 and one or more of the second fluid ports 67. Additionally, one or more of the flow paths 68 may extend through the corresponding valve body 60 in a direction perpendicular to the axial direction, thereby allowing for fluid communication between laterally offset ones of the fluid ports 66, 67. Such flow paths 68 may include combinations of such flow, including communicating a fluid both axially and laterally in a direction perpendicular to the axial direction. Such flow paths 68 may include a variety of different flow configurations including the division or combination of different flows for achieving various flow relationships between the various different ports 66, 67. For example, any number of the first fluid ports 66 may communicate with any number and any combination of the remaining first fluid ports 66 (including none), any number of the second fluid ports 67 may communicate with any number and any combination of the remaining second fluid ports 67 (including none), and any number and combination of the first fluid ports 66 may communicate with any number and combination of the second fluid ports 67. In some circumstances, one of the flow paths 68 extends only between the first fluid ports 66 or only between the second fluid ports 67 to provide a turn-around for changing an axial direction of flow of a corresponding fluid. In other circumstances, flow from one of the ports 66, 67 may branch to any number of the other ports 66, 67 arranged on either of the axial end surfaces 61, 62. In view of this variability, it should be understood that the flow paths 68 shown herein are merely exemplary in nature, as other flow path configurations and combinations of the illustrated flow path configurations may be utilized for achieving differing configurations from those shown in the accompanying examples, depending on the circumstances.

In the illustrated embodiment of FIGS. 1-8, each of the first fluid ports 66 is connected to an axially aligned one of the second fluid ports 67 by a substantially cylindrical wall segment having a configuration suitable for prescribing a desired flow configuration of any fluid entering or exiting the corresponding fluid ports 66, 67. If purely axial flow is desired, the cylindrical wall segment may extend axially between the aligned fluid ports 66, 67 in the absence of any other flow openings within the wall segment, thereby resulting in an axially extending and cylindrically shaped flow path 68 formed through the interior of the cylindrical wall segment. In other circumstances where at least some flow is desired to a lateral position within the corresponding valve body 60, the corresponding cylindrical wall segment may include an opening formed in a circumferential surface thereof for communicating with a flow opening formed between adjacent positions of the fluid ports 66, 67 (such as extending rectilinearly between the positions of adjacent ones of the fluid ports 66, 67), wherein such a flow opening connects to another opening formed in the circumferential surface of the cylindrical wall segment associated with the adjacent arranged fluid ports 66, 67. Such a flow path 68 may accordingly include a portion of the interior of a first cylindrical wall segment, a connecting flow opening, and the interior of a second cylindrical wall segment. The flow path 68 may further include additional lateral flow openings for connecting additional cylindrical wall segments associated with the remaining two positions of the fluid ports 66, 67, as desired, in accordance with the above-described variability. Examples of such flow path configurations are shown in FIG. 5, wherein the axial end surfaces 61, 62 are shown as transparent in each view to show the configuration of the flow paths 68 formed between the different positions of the fluid ports 66, 67, which are identified in dashed line form.

It should also be apparent that the flow paths 68 are not limited to the described or illustrated configurations, as substantially any configuration of hollow openings formed within each of the valve bodies 60 may be utilized for providing fluid communication between any set of the associated fluid ports 66, 67 in accordance with the desired flow configuration through the valve body 60. For example, it is conceivable that at least one of the flow paths 68 extends through the valve body 60 to a position that is axially adjacent, but separate from, another of the flow paths 68 through the valve body 60 for communicating the fluid between adjacent positions of the fluid ports 66, 67 without communicating the fluid between the two different flow paths 68. For example, one flow path 68 may connect a pair of the first fluid ports 66 while occupying only one axial half of the valve body 60 with a partition separating the one flow path 68 from any of the adjacent flow paths 68 associated with the aligned second fluid ports 67, such as when a turnaround is desired for the fluid among the corresponding first fluid ports 66. Such flow paths 68 may also include a serpentine configuration when passing through the corresponding valve body 60, including extending at least partially in the axial direction and at least partially in one or more lateral directions perpendicular to the axial direction, with as many turns and changes in direction as necessary to achieve the desired flow configuration between the corresponding fluid ports 66, 67.

Each of the first fluid ports 66 and each of the second fluid ports 67 are equally spaced from the axis of rotation of the corresponding valve body 60. Specifically, a central axis passing through a center of each respective one of the fluid ports 66, 67 is spaced a common distance from the axis of rotation of the corresponding valve body 60. This common distance is shared among all of the valve bodies 60 forming each array. Adjacent ones of the fluid ports 66, 67 with respect to the circumferential direction of each respective valve body 60 are also equally angularly offset from one another with respect to the axis of rotation of each respective valve body 60 by a common angular displacement. In the embodiment of FIGS. 1-8, each of the fluid ports 66, 67 are spaced angularly by 90° intervals to result in four different possible positions of the fluid ports 66, 67 around the respective axis of rotation. This equal spacing and equal angular displacement results in each of the fluid ports 66, 67 occupying the same positions following a rotation of the respective valve body 60 through an angle corresponding to the angular displacement present between adjacent fluid ports 66, 67. The valve bodies 60 are also positioned such that each of the first fluid ports 66 of each of the valve bodies 60 is axially aligned with a corresponding one of the flow openings 55 formed through the first sealing plate 51 whenever each respective valve body 60 is rotated by the distance corresponding to the angular offset between adjacent fluid ports 66, 67.

The embodiment illustrated in FIGS. 1-8 includes each of the valve bodies 60 having one of the fluid ports 66, 67 at each of the four respective positions on each of the axial end surfaces 61, 62 such that four different flow openings are provided at each of the axial end surfaces 61, 62, but it should be apparent that the present invention is not limited to such a configuration. In some embodiments, the position of one or more of the illustrated fluid ports 66, 67 may instead be closed off by a wall segment forming a portion of the corresponding axial end surface 61, 62, such that flow does not occur into or out of the valve body 60 at this position with respect to the corresponding axial end surface 61, 62. The lack of the presence of one of the fluid ports 66, 67 at one of the positions on the corresponding axial end surface 61, 62 is determined based on the desired flow configuration through the corresponding valve body 60 relative to the adjacent flow paths formed through the control valve 10.

As another example, each of the fluid ports 66, 67 is not necessarily limited to having a circular shape corresponding to one of the four described port positions, as any shape and positioning of the fluid ports 66, 67 may be provided for aligning the fluid ports 66, 67 with the flow openings of adjacent layers in a manner providing fluid communication therebetween. For example, as opposed to two distinct circular openings communicating a fluid in a common direction to a common component, two adjacent ones of the circular openings may be combined in a circumferentially extending arcuate slot between the position of two of the disclosed circular openings. The adjacent sealing plate may similarly include such an arcuate slot matching the shape of that formed in the valve body. Further examples of such combinations of flow into the positions of multiple different rotationally spaced port positions are shown and described with reference to the embodiment of the invention of FIGS. 11 and 12 as discussed hereinafter.

The first fixed valve body 70 is disposed between the first sealing plate 51 and the second sealing plate 52 at those positions devoid of one of the valve bodies 60. The first fixed valve body 70 includes a plurality of flow passages 71 formed therethrough, wherein each of the flow passages 71 is arranged for alignment with one of the flow openings 55 formed through the first sealing plate 51 that is not arranged for alignment with one of the first fluid ports 66 of the valve bodies 60. The first fixed valve body 70 is configured to remain stationary during a repositioning of the valve bodies 60 via the selective rotation thereof, and may alternatively be referred to as the first fixed valve body 70. The first fixed valve body 70 may alternatively be provided as a plurality of spaced apart structures having flow passages at the same positions, as desired, without departing from the scope of the present invention.

Figure 3:
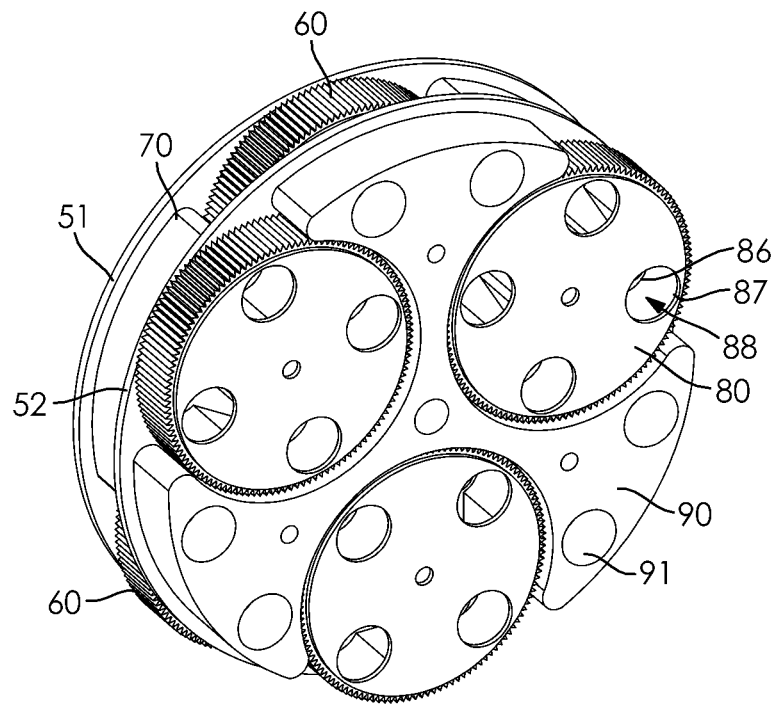
FIG. 3 is a perspective view of the interior components forming one of the valve assemblies of the control valve in the absence of a surrounding ring gear.
Figure 4:
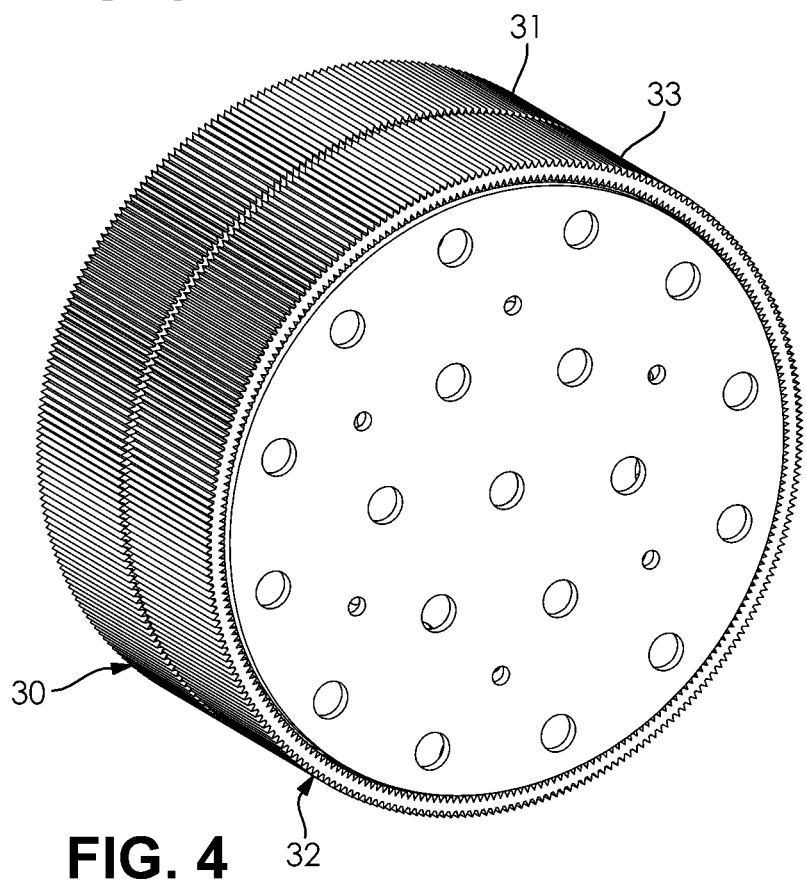
FIG. 4 is a perspective view of a stacked pair of the valve assemblies as disclosed in FIG. 3 with one of the ring gears disposed to surround each respective one of the valve assemblies.

The flow passages 71 are shown in FIGS. 2 and 3 as extending purely axially through the first fixed valve body 70, but it should be understood that the same variability of the possible configurations of the flow paths 68 may also be applied to the flow passages 71 while remaining within the scope of the present invention. For example, laterally extending passageways may be provided between the illustrated flow passages 71 for redirecting the flow of the fluid laterally from one port position to another, or for dividing or combining the flows of other ports positions. Any flow configuration shown or described with reference to one of the flow paths 68 extending between two or more of the fluid ports 66, 67 may be associated with one of the flow passages 71 for directing an associated fluid or fluids in any desired combination of lateral and/or axial directions while remaining within the scope of the present invention. For example, any of the fixed valve bodies may include a flow configuration therethrough similar to that of either of the disclosed casing shells 13, 14 including turnaround sections and axial flow sections, as desired.

The second sealing plate 52 includes a plurality of the flow openings 55 formed therethrough. Each of the flow openings 55 of the second sealing plate 52 is axially aligned with one of the second fluid ports 67 of one of the valve bodies 60 or one of the flow passages 71 of the first fixed valve body 70. Each of the flow openings 55 of the second sealing plate 52 allows for fluid communication between the two different layers of the first valve assembly 30 as separated by the second sealing plate 52. Specifically, the flow openings 55 may be assigned to a first set of the flow openings 55 and a second set of the flow openings 55, wherein each of the flow openings 55 assigned to the first set is configured to selectively provide fluid communication between the flow paths formed between adjacent layers of the rotary valve bodies 60, 80 while each of the flow openings 55 assigned to the second set is configured to selectively provide fluid communication between one of the flow paths of one of the layers of the rotary valve bodies 60, 80 and one of the flow passages formed through one of the fixed valve bodies 70, 90 of an adjacent layer.

The general structure and operation of each of the rotary valve bodies 80 of the second array is identical to that of the rotary valve bodies 60 of the first array, hence further description is omitted herefrom. However, as mentioned above, each individual valve body 60 and each individual valve body 80 may include a unique configuration of the corresponding flow paths formed therethrough, hence the present invention is not limited to an embodiment where any or all of the flow path configurations are repeated with respect to multiple valve bodies 60, 80 or multiple layers thereof. As used hereinafter, each of the valve bodies 80 of the second array includes a plurality of first fluid ports 86 formed at a first axial end thereof facing towards the second sealing plate 52 and a plurality of second fluid ports 87 formed at a second axial end thereof facing towards the third sealing plate 53. Each of the second fluid ports 87 is axially aligned with a corresponding one of the flow openings 55 formed through the third sealing plate 53.

Each of the valve bodies 80 is similarly toothed to rotate about a respective rotational axis when engagement is made with the inner teeth 36 of the first ring gear 31, depending on the configuration of the inner teeth 36 along the inner surface of the first ring gear 31. Specifically, each of the valve bodies 80 rotates when engaging a segment of the first ring gear 31 having the inner teeth 36 during a rotation of the first ring gear 31, whereas each of the valve bodies 80 may not be caused to rotate when a segment of the first ring gear 31 devoid of the inner teeth 36 passes by the engaging position of the corresponding one of the valve bodies 80.

The second fixed valve body 90 is also structurally equivalent to the first fixed valve body 70, and similarly includes a plurality of flow passages 91 formed therethrough. Each of the flow passages 91 is axially aligned with one of the second fluid ports 67 of one of the valve bodies 60 (via one of the flow openings 55 of the second sealing plate 52) at one axial end thereof. Each of the flow passages 91 is further axially aligned with one of the flow opening 55 formed through the third sealing plate 53 at an end thereof opposite the valve bodies 60. Additional passageways may also be incorporated into the second fixed valve body 90 for redirecting, dividing, or combining the different flows entering the second fixed valve body 90 in a desired manner, such as any of the flow configurations described as being suitable for communicating a fluid or fluids between the different positions of the fluid ports 67, 67 of the flow paths 68, or alternatively as described with reference to either of the casing shells 13, 14. The second fixed valve body 90 remains stationary during the rotation of the first ring gear 31.

The first layer includes three of the valve bodies 60 arranged in an equilateral triangle shape with the axis of rotation of each of the valve bodies 60 spaced equally from the axis of rotation of the first ring gear 31, with the first fixed valve body 70 filling at least a portion of a void present between the valve bodies 60. The second layer includes three of the valve bodies 80 similarly arranged in an equilateral triangle shape with the axis of rotation of each of the valve bodies 80 spaced equally from the axis of rotation of the first ring gear 31, with the second fixed valve body 90 filling a void between the valve bodies 80. However, the second layer of the first valve assembly 30 as formed by the second array of valve bodies 80 and the second fixed valve body 90 is offset angularly by 60 degrees relative to the first layer as formed by the first array of the valve bodies 60 and the first fixed valve body 70 with respect to the axis of rotation of the first ring gear 31. This angular offset results in each of the valve bodies 60 of the first layer having two of the second fluid ports 67 thereof axially aligned with one of the flow passages 91 formed through the second fixed valve body 90, one of the second fluid ports 67 axially aligned with one of the first fluid ports 86 of a first one of the valve bodies 80 of the second array, and another one of the second fluid ports 67 axially aligned with one of the first fluid ports 86 of a second one of the valve bodies 80 of the second array. The same relationship is present with respect to each of the valve bodies 80, each of which includes two first fluid ports 86 axially aligned with one of the flow passages 71 of the first fixed valve body 70, one of the first fluid ports 86 axially aligned with one of the second fluid ports 67 of a first one of the valve bodies 60, and another one of the first fluid ports 86 axially aligned with one of the second fluid ports 67 of a second one of the valve bodies 60.

The embodiment illustrated in FIGS. 1-8 includes each of the respective rotary valve bodies 60, 80 being rotatable to four different rotational positions with each of the different rotational positions corresponding to a different flow configuration through the corresponding rotary valve body 60, 80. Each different rotational position may be achieved by a rotation of the first ring gear 31 through a corresponding degree of rotation when the teeth of the first ring gear 31 and the teeth of the corresponding rotary valve body 60, 80 are in engagement with each other. As such, in some circumstances, one or more of the rotary valve bodies 60, 80 may be able to be rotated to each of the four different positions via four different rotations of the first ring gear 31. This circumstance may occur when none of the described discontinuous segments 38 of the inner teeth 36 pass by the corresponding one of the rotary valve bodies 60, 80. In other circumstances, one or more of the discontinuous segments 38 of the inner teeth 36 may pass by one of the rotary valve bodies 60, 80, hence greater than four different rotational adjustments of the first ring gear 31 may be necessary for achieving each of the four different possible positions of such rotary valve bodies 60, 80. It should also be apparent that continued rotation of the first ring gear 31 in any given direction may lead to alternative modes of operation of the corresponding rotary valve bodies 60, 80 due to the manner in which such discontinuous segments 38 of the inner teeth 36 may pass by subsequent ones of the rotary valve bodies 60, 80, thereby alternating the order of the rotary valve bodies 60, 80 not undergoing rotation between subsequent rotations of the first ring gear 31.

As can be seen in FIG. 2, the structure of the first valve assembly 30 associated with the first ring gear 31 is substantially identical to the structure of the second valve assembly 32 associated with the second ring gear 33 with the valve assemblies 30, 32 stacked relative to one another with respect to the axial direction of the control valve 10, with angular offsets introduced in repeating fashion between the different features. Due to this similarity, description of the components forming the second valve assembly 32 is omitted herefrom, as is description of a method of operation thereof. As mentioned above, any flow paths formed through the corresponding valve bodies of the second valve assembly 32 may be formed to include any desired configuration in accordance with the necessary flow configuration through the control valve 10, hence no single configuration shown or described herein is intended to be limiting.

Each of the valve bodies forming one of the valve assemblies 30, 32 may be injection molded into the prescribed shapes and configurations. Each of the valve bodies may be constructed as one, two, or three pieces, as non-limiting examples. Each of the axial end surfaces of each of the valve bodies may be associated with O-rings or other sealing elements to facilitate sealing with an adjacent sealing plate, or may be formed from or otherwise coated with a low-friction and/or low wear resistance material such as a ceramic for providing such a sealing effect. The flow paths may be molded into, machined into, or otherwise formed into the valve bodies. Each of the sealing plates may also be formed from or coated with a low friction material, or may include a sealing element such as an o-ring along a major face thereof for surrounding or circumscribing the corresponding flow openings facing towards the rotary or fixed valve bodies.

In operation, the first ring gear 31 is rotated to cause each of the valve bodies 60, 80 to rotate in accordance with the toothed relationship present between the first ring gear 31 and each of the valve bodies 60, 80 until a desired configuration is reached. The second ring gear 33 is also rotated to cause each of the corresponding valve bodies of the second valve assembly 32 to assume the desired configuration thereof. The adjustment of the control valve 10 to certain modes of operation may include only the rotation of the first ring gear 31, only the rotation of the second ring gear 32, or a combination of the rotation of each of the ring gears 31, 32, depending on the specific flow configurations formed through the control valve 10.

A fluid is introduced into the control valve 10 via one or more of the external ports 15a present within the first shell 13. The fluid passes through the respective external port 15a and then one of the flow openings 55 formed through the first sealing plate 51. The fluid passes axially through any of the flow passages 71 of the first fixed valve body 70 axially aligned with the flow of the fluid. The fluid also enters each of the corresponding first fluid ports 66 of the valve bodies 60 that are axially aligned with the external ports 15 conveying the fluid for distribution to a combination of the remaining ports 66, 67 formed in the corresponding valve body 60, depending on the configuration of the flow path(s) 68 formed therein. Depending on these flow paths 68, the fluid may move axially through the control valve 10 or may move laterally to the position of another one of the ports 66, 67. The manner in which at least a portion of each of the valve bodies 60 is partially axially aligned with at least a portion of each of the adjacent arranged valve bodies 80 results in the ability to communicate the fluid to any position of any of the fluid ports 66, 67, 86, 87 formed within any of the valve bodies 60, 80 via enough transfers among the valve bodies 60, 80, the fixed valve bodies 70, 90, and any turn-around sections 15b provided among the external ports 15a. The flow of the fluid among the valve bodies 60, 80 may include changes in axial flow direction as well as changes in lateral flow direction, as is necessary for the desired flow configuration. In some embodiments, the flow of the fluid among the fixed valve bodies 70, 90 may also include changes in lateral flow direction in addition to the illustrated axial flow therethrough.

The fluid continues to progress through the second valve assembly 32 in the same manner as that described with reference to the first valve assembly 30, wherein the alignment of the various flow features, the selected rotational position of each rotary valve body, the angular offset between adjacent layers, and the prescribed flow paths within each of the valve bodies determines the flow path taken by the fluid. Specifically, the third sealing plate 53 may act as the first sealing plate of the next assembly, with the remaining layers of structure repeated and operating in the same fashion with respect to the axial direction of the control valve 10.

It should be understood that some configurations may include the fluid of some flows remaining exclusively within one of the valve assemblies 30, 32, such as turning around and flowing towards one of the external ports 15a of the same casing shell 13, 14, while remaining within the scope of the present invention. Other flow configurations may include the fluid passing through each successive layer of each of the valve assemblies 30, 32 to exit the other of the casing shells 13, 14, as desired, via the external ports 15a thereof.

It should be apparent that the control valve 10 may utilize only one of the valve assemblies 30, 32 while still allowing for variability of the flow configurations therethrough, hence the second valve assembly 32 may be omitted from such embodiments and the casing 12 may instead enclose only the first valve assembly 30, which may be driven exclusively by the first actuator 17. Alternatively, these features may be repeated in the stacking direction to introduce additional flow path configurations via the use of additional valve assemblies, such as the use of a third valve assembly having similar repeated structure. It is also conceivable that one of the valve assemblies associated with one of the ring gears may include three or more layers of the rotary valve bodies and fixed valve bodies disposed therein, as opposed to the disclosed two, for prescribing flow through three different layers via the actuation of a single actuator. Such a configuration would operate identically to that shown and described, but would merely include the use of an additional sealing plate and the axial extension of the associated ring gear for engagement with each of the three layers of the valve bodies. It is also understood that any combination of such layers may be utilized, such as one ring gear turning two layers of rotary valve bodies, another ring gear turning three layers, etc., and any combinations thereof. The ring gear of each valve assembly may also be divided axially to include different patterns of the internal teeth thereof with respect to each of the layers of the rotary valve bodies associated with the corresponding ring gear, such as including a different circumferential distribution of the discontinuous segments of the teeth with respect to different axial positions on the same ring gear. Such a configuration may result in axially adjacent segments of the inner teeth being different from each other with one of the segments including the teeth and the adjacent one of the segments devoid of the teeth. In this way, additional variability may be added to the flow configurations achievable via the rotation of the corresponding one of the ring gears.

The control valve 10 may also include a hydraulic clutch feature where pressure from a fluid pump associated with movement of the fluid through the control valve 10 can be used to separate the features of adjacent layers of each valve assembly when the pressure experienced within the control valve 10 is relatively low, and to then engage the features of adjacent layers together axially when the pressure is relatively high, thereby ensuring that suitable sealing is achieved when a new operational mode has been achieved by the reconfiguration of the rotary valve bodies. This may be achieved through a system of incorporated channels, diaphragms, and springs, as desired. Alternatively, the control valve 10 may include a mechanical ramp feature that automatically engages to clamp and release the plates and engaging valve bodies during the early stages of rotation between adjacent features of the layers of the control valve 10.

Figure 7:
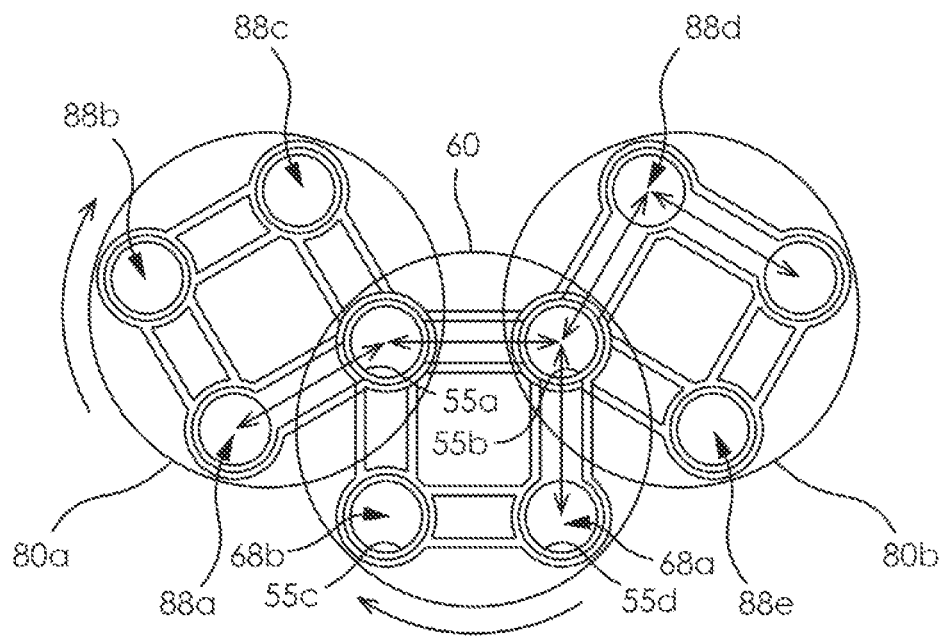
FIG. 7 is a partially schematic illustration of an exemplary configuration of one of the rotary valve bodies of a first layer of a valve assembly relative to a pair of the rotary valve bodies of a second adjacent layer of the valve assembly according to a first rotational position of a corresponding ring gear, wherein the rotary valve bodies of the adjacent layers are shown in transparent and overlapping form to illustrate the manner in which the flow paths of the first layer can potentially interact with the flow paths of the second layer according to the disclosed configuration.
Figure 8:
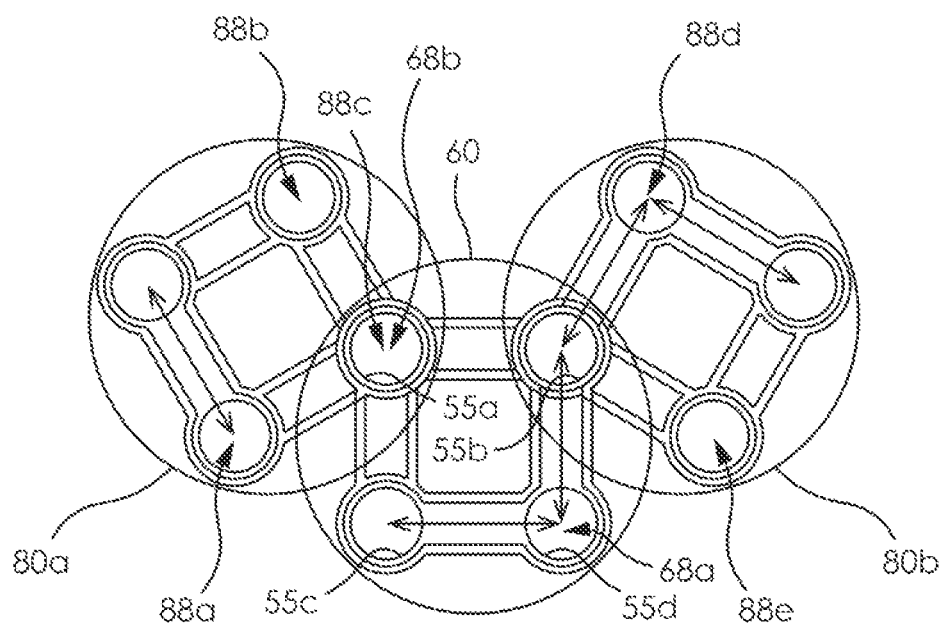
FIG. 8 is a partially schematic illustration of another exemplary configuration of the one of the rotary valve bodies of the first layer relative to the pair of the rotary valve bodies of a second layer according to a second rotational position of a corresponding ring gear, wherein the rotary valve bodies of the adjacent layers are again shown in transparent and overlapping form to illustrate the manner in which the flow paths of the first layer can potentially interact with the flow paths of the second layer according to the disclosed configuration.

FIGS. 7 and 8 schematically illustrate exemplary flow configurations that may be present between the portions of the different layers of one of the valve assemblies according to several of the described features of the present invention. The present example shows one of the rotary valve bodies 60 of the first layer positioned relative to two of the rotary valve bodies (labeled 80a and 80b for differentiating purposes) of the second layer for disclosing exemplary flow configurations that may occur between the different layers in reaction to a corresponding rotation of a ring gear engaging each of the disclosed layers, such as the first ring gear 31 of FIG. 2. It should be readily apparent that the features shown with respect to this limited combination of rotary valve bodies 60, 80a, 80b may be repeated throughout the corresponding valve assembly for prescribing the desired flow of the fluid in the axial or lateral directions thereof based on the explanation hereinafter.

The disclosed configuration includes a first portion of the rotary valve body 60 axially aligned with and overlapping a first portion of the rotary valve body 80a, with one of the flow openings (labeled 55a for differentiating purposes) providing fluid communication between the different flow paths 68, 88 formed axially through the overlapping and axially aligned portions by being disposed axially between the rotary valve body 60 and the rotary valve body 80a. The flow opening 55a may be said to belong to the first set of the flow openings 55 providing fluid communication between adjacent layers of the rotary valve bodies 60, 80, as opposed to one of the layers of the rotary valve bodies 60, 80 and one of the layers of the fixed valve bodies 70, 90. The configuration further includes a second portion of the rotary valve body 60 axially aligned with and overlapping a first portion of the rotary valve body 80b, and another one of the flow openings (labeled 55b) disposed axially between the second portion of the rotary valve body 60 and the first portion of the rotary valve body 80b for providing fluid communication therebetween.

The exemplary rotary valve bodies 60, 80a, 80b include flow paths 68, 88 of various different configurations, which should be considered non-limiting. The rotary valve body 60 includes a first flow path (labeled 68a for differentiation purposes) in fluid communication with three of the possible adjacent port positions and a second flow path 68b extending axially through the rotary valve body 60 at one port position. The rotary valve body 80a includes a first flow path 88a in fluid communication with two possible port positions, a second flow path 88b formed axially through the rotary valve body 80a at one port position, and a third flow path 88c also formed axially through the rotary valve body 80a at one port position. The rotary valve body 80b includes a similar configuration to the rotary valve body 60 and includes a first flow path 88d in fluid communication with three of the possible adjacent port positions and a second flow path 88e extending axially through the rotary valve body 80b at one port position. It is assumed for the present example that each of the possible four port positions for each of the rotary valve bodies 60, 80a, 80b includes at least one of the opposing fluid ports 66, 67 for communicating the corresponding fluid axially in either of the opposing axial directions following the lateral flows shown in the corresponding examples.

FIG. 7 corresponds to the first ring gear 31 (not shown in FIG. 7), which is selectively engaging each of illustrated rotary valve bodies 60, 80a, 80b, at a first rotational position thereof. The first rotational position corresponds to the flow opening 55a being in fluid communication with the first flow path 68a of the rotary valve body 60 and the first flow path 88a of the rotary valve body 80a on the opposing axial sides thereof. The first rotational position also corresponds to the flow opening 55b being in fluid communication with the first flow path 68a (via a different port than the flow opening 55a) of the rotary valve body 60 and the first flow path 88d of the rotary valve body 80b on the opposing axial sides thereof. As shown by the arrows among those flow paths 68a, 88a, 88d in communication with multiple laterally displaced port positions, the first flow configuration may correspond to the fluid flowing across all three of the disclosed rotary valve bodies 60, 80a, 80b when transferred back and forth axially at the flow openings 55a, 55b, depending on the circumstances.

In contrast, FIG. 8 corresponds to the first ring gear 31 having undergone a selective degree of rotation thereof for causing each of the rotary valve body 60 and the rotary valve body 80a to have rotated one port position in the clockwise direction, as indicated by the rotational arrows around each of the rotary valve bodies 60, 80a in FIG. 7. However, this example also corresponds to the rotary valve body 80b having one of the discontinuous segments of the teeth (not shown in FIG. 7) at the tangential position for engaging the first ring gear 31 when rotated from the first rotational position to the second rotational position of FIG. 8, hence the rotary valve body 80b is shown as not having undergone any rotation from FIG. 7 to FIG. 8.

The second rotational position of the first ring gear 31 corresponds to the flow opening 55a being in fluid communication with the axially extending second flow path 68b of the rotary valve body 60 and the axially extending second flow path 88b of the rotary valve body 80a on the opposing axial sides thereof. The second rotational position also corresponds to the flow opening 55b again remaining in fluid communication with the first flow path 68a (via a different port than FIG. 7) of the rotary valve body 60 and the first flow path 88d of the rotary valve body 80b on the opposing axial sides thereof. As shown by the arrows among those flow paths 68a, 88a, 88d in communication with multiple laterally displaced port positions, the second flow configuration corresponds to different combinations of lateral and axial flow between the different flow paths 68a, 68b, 88a, 88b, 88c, 88d, 88e.

Although not described in detail, it can also be seen that the relationships present between the remaining flow opening 55c, 55d in axial alignment with the rotary valve body 60 and an adjacent fixed valve body (not shown) also are subject to change when the first ring gear 31 is adjusted from the first rotational position to the second rotational position thereof. For example, the flow opening 55c experiences a switching of which of the flow paths 68a, 68b is in fluid communication with the corresponding axially aligned fixed valve body between the first and second rotational positions. It should be readily apparent from a review of the remaining figures that this same relationship is present with respect to each of the flow openings 55 not aligned with and disposed axially between two of the rotary valve bodies of different layers of one or more valve assemblies, hence these same concepts may be applied at any position with the control valve 10.

Figure 9:
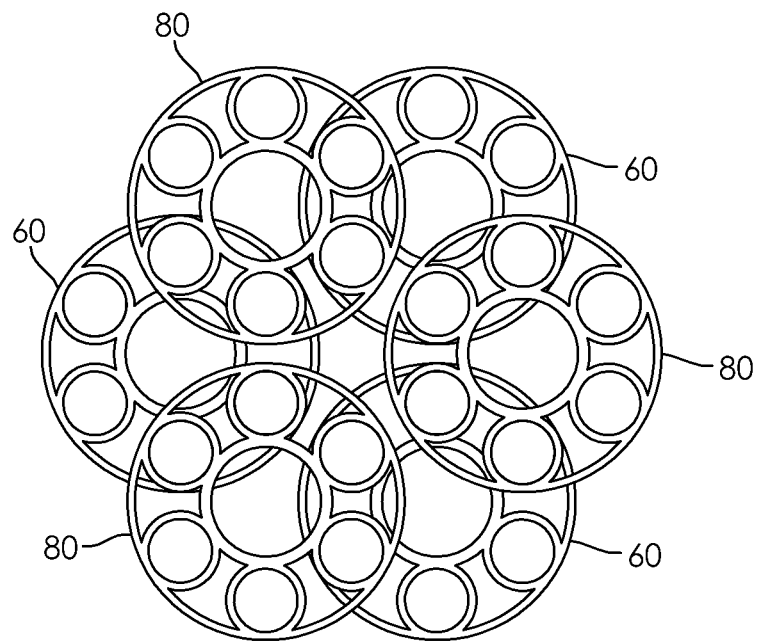
FIG. 9 illustrates a first flow port configuration as may be found between adjacent layers of a valve assembly having six different possible port positions associated with each of the rotary valve bodies of each of the adjacent layers according to another embodiment of the present invention, wherein the first flow port configuration includes each of the rotary valve bodies axially aligning and overlapping with two of the rotary valve bodies of an adjacent layer at each of two different possible port positions with respect to each overlapping rotary valve body.
Figure 10:
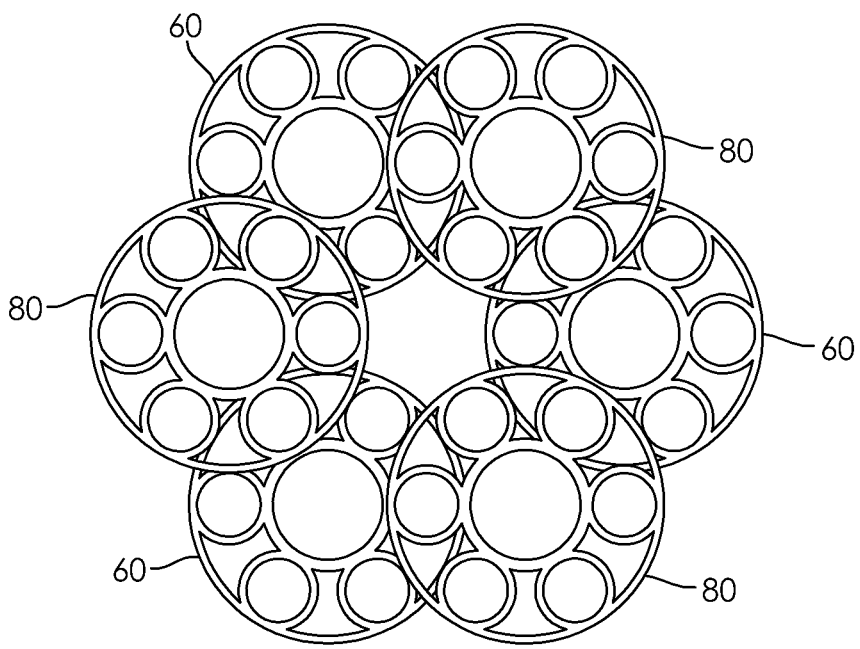
FIG. 10 illustrates a second flow port configuration as may be found between adjacent layers of a valve assembly having six different possible port positions associated with each of the rotary valve bodies of each of the adjacent layers according to another embodiment of the present invention, wherein the second flow port configuration includes each of the rotary valve bodies axially aligning and overlapping with two of the rotary valve bodies of an adjacent layer at a single possible port position with respect to each overlapping rotary valve body.

FIGS. 9 and 10 illustrate additional possible configurations of the valve bodies of adjacent layers of such a control valve having six of the fluid ports as opposed to four. However, the same general principles still apply, wherein at least some of the fluid ports of adjacent layers are aligned with each other while the valve bodies of adjacent layers are offset angularly to cause each of the valve bodies to axially overlap with multiple other valve bodies of the adjacent layers.

Specifically, FIG. 9 illustrates one example of a six-port position configuration that is tightly packed to include each of the rotary valve bodies 60 of one layer overlapping each of two of the rotary valve bodies 80 of the adjacent layer at each of two different port positions, as opposed to the single port position overlap of the embodiment of FIGS. 1-8. Such a configuration may further result in each of the rotary valve bodies 60, 80 being axially aligned with two different flow openings 55 associated with an adjacent arranged fixed valve body 70, 90. In contrast, FIG. 10 illustrates a less tightly packed six-port position configuration that includes each of the rotary valve bodies 60, 80 of one layer overlapping each of the two of the rotary valve bodies 60, 80 of the adjacent layer at only one port position. This results in each of the rotary valve bodies 60, 80 having four open port positions for communicating with an adjacent fixed valve body, or the like, via those flow openings not axially aligned with one of the rotary valve bodies 60, 80 from each of the adjoining and axially adjacent layers.

Each of the six-port position configurations includes the port positions distributed at equal distances from the respective axis of rotation of the corresponding rotary valve body while angularly offset from one another by 60 degree increments. The six-port position configurations operate in substantially identical fashion to the disclosed four-port position configuration, with the primary differences relating to the different overlaps that can be utilized and the additional operational modes that can be utilized via the introduction of the additional ports. For example, each of the rotary valve bodies may be associated with six different unique positions thereof where the port positions are aligned with adjacent layers of the valve assembly as opposed to four, thereby increasing the number of available flow configurations that can be achieved merely by use of one of the corresponding actuators and ring gear assemblies.

Figure 11:
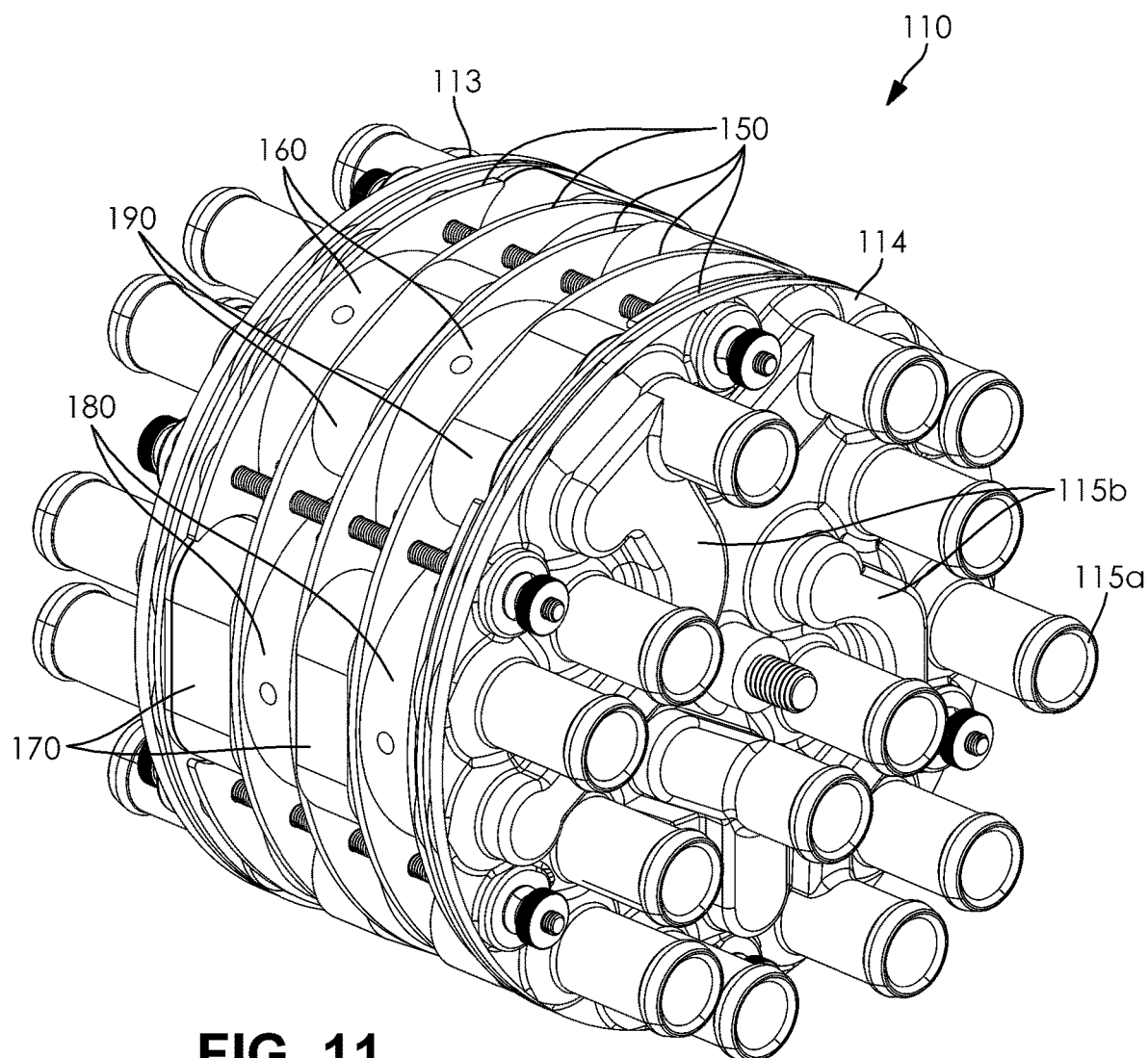
FIG. 11 is a perspective view of a planetary multi-port fluid control valve according to another embodiment of the present invention, wherein the control valve utilizes the first flow configuration disclosed in FIG. 9.
Figure 12:
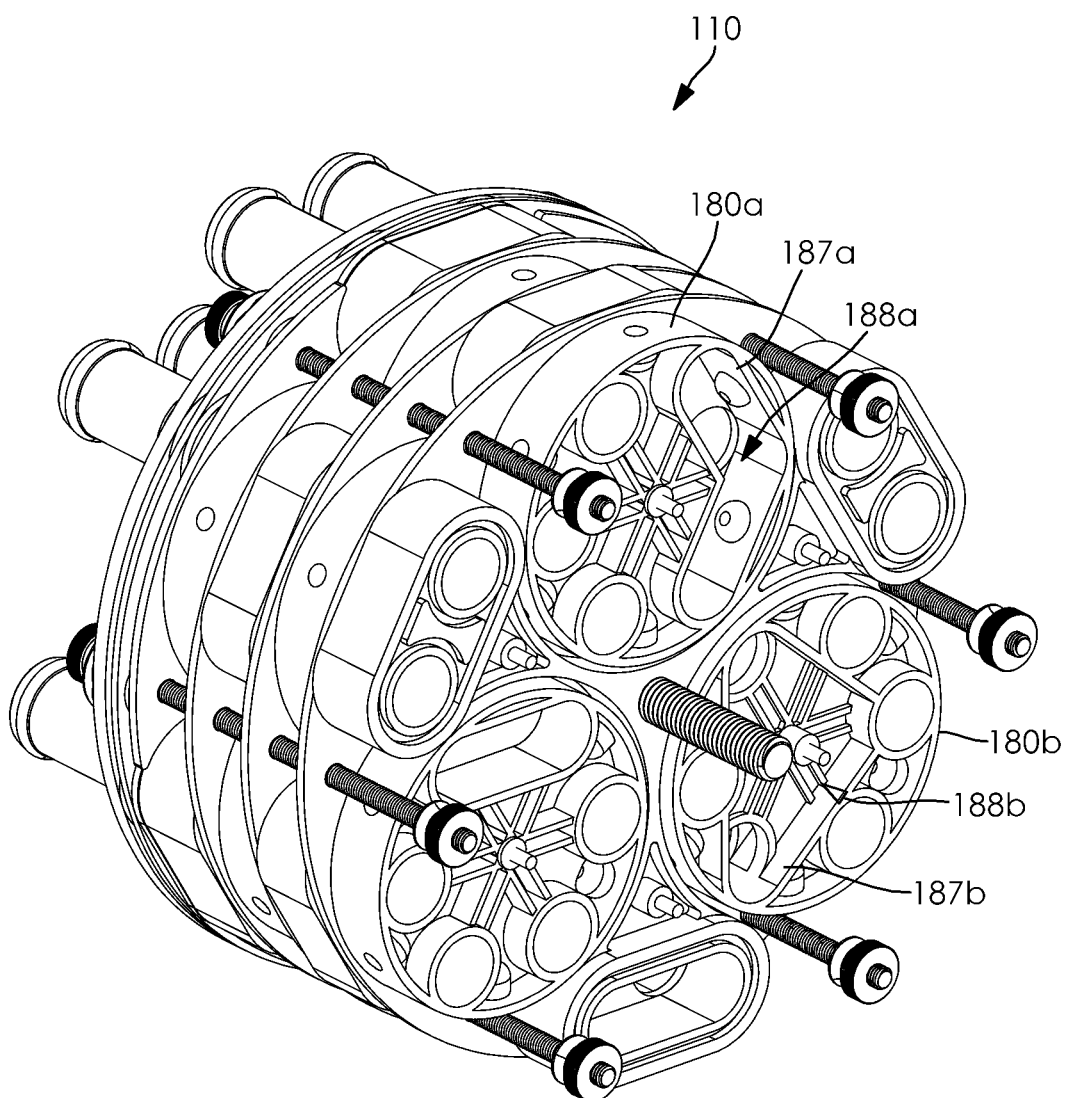
FIG. 12 is a perspective view of the control valve of FIG. 11 with a casing cover plate and a sealing plate thereof removed to expose one exemplary flow path configuration achievable via the first flow port configuration as shown via the exposure of the rotary valve bodies and the corresponding flow paths formed therein with respect to one layer of the valve assembly.

FIGS. 11 and 12 illustrate an embodiment of six-port configuration utilized in a multi-port planetary fluid control valve 110 according to another embodiment of the present invention. The control valve 110 operates in substantially identical fashion to the control valve 10, hence further description is omitted where not relevant hereinafter. The control valve 110 is shown throughout in the absence of the surrounding ring gears to more clearly show the stacked nature of the six-port configuration when implemented into multiple layers. The control valve 110 includes opposing casing shells 113, 114 compressed towards alternating layers of first rotary valve bodies 160 and second rotary valve bodies 180, wherein angular displacements are present between the different layers of the rotary valve bodies 160, 180 to introduce axial alignments and overlaps between portions of the axially adjacent rotary valve bodies 160, 180 in accordance with the configuration shown in FIG. 9. The alternating layers also include fixed valve bodies 170, 190 at those positions devoid of one of the rotary valve bodies 160, 180. One of a plurality of sealing plates 150 is disposed between adjacent layers of the valve bodies 160, 170, 180, 190.

The control valve 110 also illustrates various features described herein as being applicable for use with the control valve 10 of FIGS. 1-8. With specific reference to FIG. 11, the shell 114 includes an axially extending external fluid port 115a associated with a single port position as well as a multi-port external fluid port 115b in fluid communication with multiple different port positions, including port positions disposed at positions that are not immediately adjacent the port position from which an axially extending portion of the fluid port 115b extends for connection to an external fluid line, pipe, hose, or the like. Such a combining and redirecting of flow as shown with respect to the shell 114 may also be applied to any of the flow passages formed through any of the fixed valve bodies, as desired, or may be utilized within one of the sealing plates between adjacent layers of the valve assembly.

With specific reference to FIG. 12, a pair of rotary valve bodies 180a, 180b of one of the layers of the rotary valve bodies 180 are shown as exposed via the removal of adjacent layers of the valve assembly. Each of the rotary valve bodies 180a, 180b includes a contrary fluid port configuration at an end face thereof in comparison to those shown throughout FIGS. 1-8. Specifically, the rotary valve body 180a includes a two-legged flow path 188a having a slotted two-legged perimeter shape of the corresponding fluid port 187a, as opposed to the use of three independent and circular fluid ports at each of the corresponding port positions. Instead, the opening formed within the perimeter of the fluid port 187a is able to fluid communicate with any of the aligned fluid openings formed through the adjacent sealing plate 150. The rotary valve body 180b includes a substantially triangular flow path 188b that extends around an axis of rotation of the rotary valve body 180b, including a perimeter of the corresponding fluid port 187b extending around the axis of rotation to the position of two non-adjacent port positions. The opening formed by the perimeter of the fluid port 187b is therefore similarly able to fluidly communicate with any of the flow opening formed within an adjacent sealing plate 150 that are axially aligned with the triangular shaped flow path 188b. The rotary valve bodies 180a, 180b are accordingly representative of additional flow configurations that may be utilized with respect to any of the rotary valve bodies of any of the embodiments disclosed herein.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A fluid control valve comprising:
a first valve assembly comprising:
a cylindrical first ring gear configured to selectively rotate about an axis of rotation thereof;
an array of first rotary valve bodies, wherein each of the respective first rotary valve bodies is cylindrical in shape and includes a corresponding axis of rotation, wherein each of the respective first rotary valve bodies is configured to individually rotate about the corresponding axis of rotation thereof in reaction to rotation of the first ring gear, each of the first rotary valve bodies including at least one first flow path formed therethrough;
an array of second rotary valve bodies offset from the array of the first rotary valve bodies with respect to an axial direction of the first ring gear, wherein each of the respective second rotary valve bodies is cylindrical in shape and includes a corresponding axis of rotation, wherein each of the respective second rotary valve bodies is configured to individually rotate about the corresponding axis of rotation thereof in reaction to rotation of the first ring gear, each of the second rotary valve bodies including at least one second flow path formed therethrough; and
a first sealing plate disposed between the array of the first rotary valve bodies and the array of the second rotary valve bodies with respect to the axial direction of the first ring gear, the first sealing plate including a plurality of first flow openings formed axially therethrough, wherein each of the first flow openings is configured to provide fluid communication between one of the first flow paths of the array of first rotary valve bodies and one of the second flow paths of the array of second rotary valve bodies.

2. The fluid control valve of claim 1, wherein a first rotational position of the first ring gear corresponds to a first one of the first flow openings being in fluid communication with a first one of the first flow channels, and wherein a second rotational position of the first ring gear corresponds to the first one of the first flow openings being in fluid communication with a second one of the first flow channels.

3. The fluid control valve of claim 2, wherein the first rotational position of the first ring gear corresponds to the first one of the first flow openings being in fluid communication with a first one of the second flow channels, and wherein the second rotational position of the second ring gear corresponds to the first one of the first flow openings being in fluid communication with a second one of the second flow channels.

4. The fluid control valve of claim 1, wherein at least one of the first flow paths extends axially through the corresponding one of the first rotary valve bodies from a first axial end surface to an opposing second axial end surface thereof.

5. The fluid control valve of claim 1, wherein at least one of the first flow paths extends in a direction perpendicular to the axis of rotation of the corresponding first rotary valve body.

6. The fluid control valve of claim 1, wherein at least one of the first flow paths is axially aligned with and in fluid communication with at least two of the first flow openings.

7. The fluid control valve of claim 1, wherein the array of first rotary valve bodies includes three of the first rotary valve bodies, wherein the axes of rotation of the three first rotary valve bodies are arranged in an equilateral triangle.

8. The fluid control valve of claim 7, wherein the array of second rotary valve bodies includes three of the second rotary valve bodies, wherein the axes of rotation of the three second rotary valve bodies are arranged in an equilateral triangle.

9. The fluid control valve of claim 8, wherein the equilateral triangle formed by the axes of rotation of the three first rotary valve bodies is offset angularly 60° from the equilateral triangle formed by the axes of rotation of the three second rotary valve bodies with respect to the axis of rotation of the first ring gear.

10. The fluid control valve of claim 1, wherein a first portion of a first one of the first rotary valve bodies is axially aligned with a first portion of a first one of the second rotary valve bodies.

11. The fluid control valve of claim 10, wherein at least one of the first flow openings is disposed axially between the first portion of the first one of the first rotary valve bodies and the first portion of the first one of the second rotary valve bodies.

12. The fluid control valve of claim 11, wherein a second portion of the first one of the first rotary valve bodies is axially aligned with a first portion of a second one of the second rotary valve bodies, wherein at least one of the first flow openings is disposed axially between the second portion of the first one of the first rotary valve bodies and the first portion of the second one of the second rotary valve bodies.

13. The fluid control valve of claim 1, wherein each of the first rotary valve bodies includes a plurality of first fluid ports formed at an outer surface thereof, wherein each of the first flow paths extends to at least two of the first fluid ports of the corresponding one of the first rotary valve bodies with each of the first fluid ports forming an inlet or an outlet into the corresponding first flow path.

14. The fluid control valve of claim 13, wherein each of the first fluid ports of each of the first rotary valve bodies is formed at one of a first axial end surface or an opposing second axial end surface of the corresponding first rotary valve body, wherein each of the first fluid ports is spaced equally from the axis of rotation of the corresponding one of the first rotary valve bodies, and wherein each of the first fluid ports of each of the first rotary valve bodies is angularly displaced from an adjacent one of the first fluid ports with respect to the axis of rotation of the corresponding one of the first rotary valve bodies by a common angular displacement.

15. The fluid control valve of claim 14, wherein the common angular displacement is one of 60° or 90°.

16. The fluid control valve of claim 1, further comprising an actuator configured to selectively rotate the first ring gear.

17. The fluid control valve of claim 1, further comprising a first fixed valve body configured to not rotate in reaction to rotation of the first ring gear, wherein the first fixed valve body includes at least one first flow passage formed therethrough, and wherein the first sealing plate further includes at least one second flow opening formed therethrough, wherein each of the second flow openings is configured to provide fluid communication between one of the first flow passages of the first fixed valve body and one of the first flow paths of the array of the first rotary valve bodies or one of the second flow paths of the array of the second rotary valve bodies.

18. The fluid control valve of claim 1, wherein each of the respective first rotary valve bodies is configured to individually rotate about the corresponding axis of rotation thereof in reaction to rotation of the first ring gear when inner teeth disposed on an inner surface of the first ring gear engage outer teeth disposed on the corresponding one of the first rotary valve bodies, and wherein each of the respective first rotary valve bodies is configured to not individually rotate about the corresponding axis of rotation thereof in reaction to rotation of the first ring gear when a segment of the inner surface of the first ring gear devoid of the inner teeth passes by the outer teeth of the corresponding one of the first rotary valve bodies.

19. The fluid control valve of claim 1, further comprising:
a second valve assembly spaced apart from the first valve assembly with respect to the axial direction of the first ring gear, the second valve assembly comprising:
a cylindrical second ring gear configured to selectively rotate about an axis of rotation thereof;
an array of third rotary valve bodies, wherein each of the respective third rotary valve bodies is cylindrical in shape and includes a corresponding axis of rotation, wherein each of the respective third rotary valve bodies is configured to individually rotate about the corresponding axis of rotation thereof in reaction to rotation of the first ring gear, each of the third rotary valve bodies including at least one third flow path formed therethrough;
an array of fourth rotary valve bodies offset from the array of the third rotary valve bodies with respect to an axial direction of the second ring gear, wherein each of the respective fourth rotary valve bodies is cylindrical in shape and includes a corresponding axis of rotation, wherein each of the respective fourth rotary valve bodies is configured to individually rotate about the corresponding axis of rotation thereof in reaction to rotation of the second ring gear, each of the fourth rotary valve bodies including at least one fourth flow path formed therethrough; and
a second sealing plate disposed between the array of the third rotary valve bodies and the array of the fourth rotary valve bodies with respect to the axial direction of the second ring gear, the second sealing plate including a plurality of second flow openings formed axially therethrough, wherein each of the second flow openings is configured to provide fluid communication between one of the third flow paths of the array of third rotary valve bodies and one of the fourth flow paths of the array of fourth rotary valve bodies.

20. The fluid control valve of claim 19, further comprising a third sealing plate disposed axially between the first valve assembly and the second valve assembly, the third sealing plate includes at least one third flow opening providing fluid communication between one of the second flow paths of the array of the second rotary valve bodies and one of the third flow paths of the array of third rotary valve bodies.

* * * * *